March 2, 1926.

P. J. SEFERLIS 1,575,284

DEPTH GAUGE

Filed August 2, 1922

Inventor
Peter J. Seferlis

By J. K. Bryant
Attorney

Patented Mar. 2, 1926.

1,575,284

UNITED STATES PATENT OFFICE.

PETER J. SEFERLIS, OF ITHACA, NEW YORK.

DEPTH GAUGE.

Application filed August 2, 1922. Serial No. 579,152.

*To all whom it may concern:*

Be it known that I, PETER J. SEFERLIS, a citizen of the United States of America, residing at Ithaca, in the county of Tompkins and State of New York, have invented certain new and useful Improvements in Depth Gauges, of which the following is a specification.

This invention relates to certain new and useful improvements in liquid level indicator, and has particular reference to that type of indicator adapted to be mounted upon the dash or instrument board of an automobile and may be associated with a gasolene tank, the crank case of the automobile engine, or the radiator of the automobile for indicating the depth of gasolene, oil, or water.

The primary object of the invention resides in the provision of a depth gauge embodying a pipe line or conduit extending between a receptacle, such as a gasolene tank, sump or crank case of a gasolene engine or an automobile radiator, and a gauge tube with an elbow associated with the gauge tube containing a liquid adapted to be elevated in the gauge tube by air pressure in the conduit, the air being compressed by fluid placed in the receptacle for indicating the depth of the fluid.

A further object of the invention is to provide a depth gauge especially designed for use in connection with the gasolene tanks of automobiles for registering the depth or quantity of gasolene within the tank wherein the filling of the tank with gasolene will force or compress air in a conduit that is in communication with a depth gauge containing a liquid adapted to be elevated by the air pressure in a gauge tube for indicating the depth of the gasolene in the tank.

With these general objects in view and others that will appear as the nature of the invention is better understood, the same consists in the novel construction, combination and arrangement of parts hereinafter more fully described, illustrated in the accompanying drawing, and pointed out in the appended claims.

Figure 1:
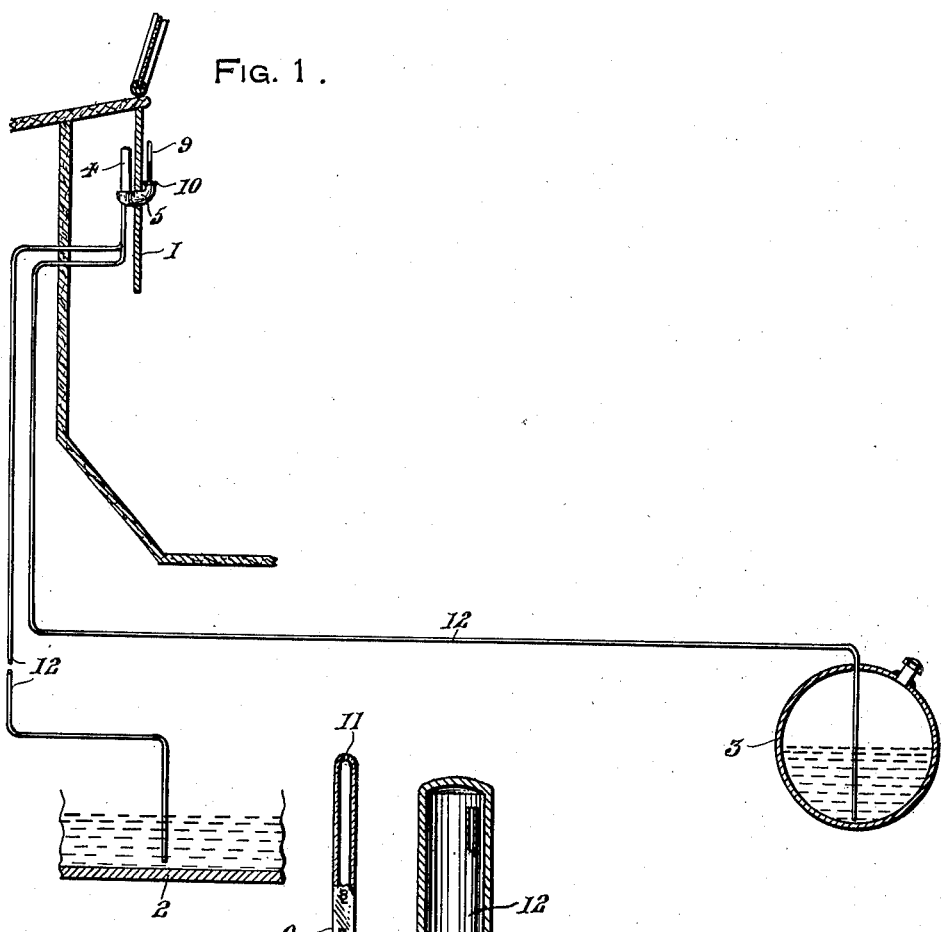
Figure 2:
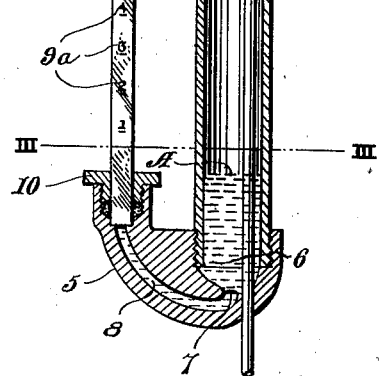
Figure 3:
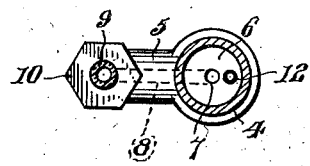

In the drawing forming a part of this application, and in which like designating characters refer to corresponding parts throughout the several views, Figure 1 is a fragmentary sectional view of a portion of an automobile showing the dash board, engine crank case, and gasolene tank with the present type of depth gauge associated with the crank case and tank, Figure 2 is a vertical sectional view of the depth gauge and fitting with the conduit communicating with the crank case and tank broken away, and Figure 3 is a horizontal sectional view taken on line III—III of Figure 2, showing the depth gauge indicating tube and the conduit entering the stand pipe or air chamber of the depth gauge.

Briefly described, the present invention aims to provide a depth gauge especially adapted for mounting upon the instrument board of an automobile and capable of association with either an automobile radiator, engine crank case, or gasolene tank, and if desired, separate depth gauges and conduit sections may be provided for each of the above-noted accessories. The depth gauge embodies a fitting having an elbow section carrying a stand pipe or air chamber with a gauge tube connected to the elbow of the fitting, said elbow containing a fluid such as kerosene that is adapted to be elevated in the gauge tube by air pressure in the stand pipe or air chamber through the medium of a pipe line extending from a point adjacent the bottom of the radiator, crank case or gasolene tank to the upper end of the stand pipe to have the air forced through the pipe line and compressed in the stand pipe upon filling the radiator, crank case or tank, for transferring the fluid in the lower end of the stand pipe and elbow into the gauge tube for accurately indicating the depth of fluid in either of the aforementioned receptacles.

The accompanying drawing shows the depth gauge per se supported upon the instrument board 1 of the automobile with conduits or pipe lines communicating with the crank case 2 of the engine and the gasolene tank 3 thereof. The depth gauge embodies a perpendicular stand pipe 4, constituting an air compression chamber that is supported at the lower end thereof, an elbow fitting 5 secured to the instrument board 1 as illustrated in Figure 1. The stand pipe 4 and elbow 5 form a fitting of J-shape and may be constructed in any preferred manner, one method being shown in Fig. 2 wherein the lower open end of the stand pipe is threaded into one side or end of the elbow 5. The lower end of the stand pipe 4 is reduced as at 6, to provide a restricted opening 7 communicating with a relatively small passage 8 in the elbow 5, while a gauge tube 9 of transparent material, preferably glass, is removably mounted in the upper end of the elbow 5 and so retained by a gland nut 10, as shown in Figure 2. The gauge tube 9 is graduated as at 9ª and has a relatively small opening 11 at the upper end thereof.

The elbow 5 of the depth gauge is so mounted upon the instrument board 1 as to present the gauge tube 9 to view, while the stand pipe 4 is positioned rearwardly thereof, as shown in Figure 1. An air conduit or pipe line 12 extends from the gasolene tank 3, to the stand pipe 4, one end of the conduit terminating at a point adjacent the bottom wall of the tank, while the other end thereof extends upwardly into the stand pipe from the lower end thereof and terminates at a point adjacent the upper end as shown in Figure 2. While Figure 1 of the drawing shows separate conduits extending from the crank case 2 and the gasolene tank 3 to the instrument board 1, it is to be understood that a separate and independent depth gauge is provided for each conduit.

In the operation of the device, assuming that the gasolene tank 3 is empty, and the fluid A in the elbow 5 of the depth gauge is at the level indicated in Figure 2, gasolene introduced into the tank 3 rising therein will force air through the conduit 12 and into the stand pipe or air chamber 4 for engagement with the fluid A to force the same through the elbow 5 and upwardly into the gauge tube 9 for accurately indicating by the graduations 9ª on said tube, the exact depth of gasolene within said tank. The gauge being in the proximity of the engine of an automobile, air in the stand pipe 4 and pipe 12 becoming heated will expand and cause an incorrect reading of the liquid depth upon the gauge tube 9. To overcome this difficulty, it is only necessary to blow or force air through the open upper end of the tube 9, which displaces the fluid in passage 8 by moving the same into the lower end of stand pipe 4 and replenishes air in the stand pipe and conduit 12. During this blowing action, all liquid has been displaced from the end of the pipe 12 extending into the tank 3 and when a blowing action on the tube 9 is stopped, the fluid A in stand pipe 4 will immediately seek its level by having a portion thereof moved through the relatively small restricted passage 8 with the fluid in the passage and stand pipe attaining its level. The entire length of the passage 8 being considerably restricted relative to the stand pipe 4, a very fine thread-like stream of fluid moves through the passage so that leveling of the fluid in the passage and stand pipe is accomplished almost instantly and substantially at the time that the liquid in tank 3 starts to enter the lower end of pipe 12. It will, therefore, be seen that the fluid A having assumed its level, air pressure in the pipe 12 and stand pipe 4 operates upon the relatively large area of the fluid in the pipe 12 to move a part of the fluid through the relatively small passage 8 to indicate a correct reading on the gauge tube of the exact amount of liquid in the tank 3. It is also to be noted that the leveling of the fluid A having been attained substantially at the time of entry of the liquid into the lower end of the pipe 12, continued entry of the liquid will immediately cause the air in the stand pipe to act upon the fluid A for an instant correct reading of the gauge. The provision of the passage 8 having a relatively small diameter is absolutely essential for the correct operation of the gauge as it is necessary that the leveling of the liquid A be attained before, or substantially at the time of entry of the liquid in the tank 3 into the lower end of the pipe 12. When the gasolene in the tank 3 is consumed during the operation of the automobile engine, the level thereof will be lowered, consequently reducing the air pressure in the conduit 12 and stand pipe 4, permitting the fluid A in the gauge tube 9 to be lowered accurately indicating the gasolene consumption and determining the quantity of gasolene in the tank 3. The principal feature of this invention refers more particularly to the diameter of the passage 8 in the elbow 5. To assure an accurate reading of the gauge tube 9 at all times, especially when the liquid in the tank or receptacle 3 closely approaches the bottom thereof, and when the pressure in the pipe 12 is correspondingly reduced, the passage 8 in the elbow must be so proportioned with respect to the diameter of the stand pipe 4 and gauge tube 9, as to have the liquid therein sensitive to slight variances of air pressure in the pipe 4. By forming the passage 8 of a predetermined relatively small diameter as compared with the area of the liquid level surface in the stand pipe 4, accurate reading of the gauge tube 9 disclosing the exact quantity of liquid in the tank 3 can be obtained. The apparatus is as well adapted for association with the sump chamber or crank case of an automobile engine, as well as the radiator thereof, the depth of fluid within a receptacle being accurately indicated upon the gauge tube.

The opening 11 in the upper end of the tube 9 permits the escape of air when the fluid A rises therein permitting an unobstructed rise of the fluid and an accurate reading on the gauge tube. The device being positioned in proximity of the engine, heat radiating from the engine will cause air in the stand pipe 4 to expand and displace the fluid A resulting in an inaccurate reading on the gauge tube. To obviate this feature, air may be forced through the tube 9 by blowing through the perforated end 11 in any suitable manner, displacing the liquid from the tube 9 and air from the stand pipe 4 and conduit 12, causing the liquid in the lower end of the conduit to be discharged therefrom and replenishing air at atmospheric temperature in the stand pipe and conduit.

While the form of the invention herein shown and described is what is believed to be the preferred embodiment thereof, it is nevertheless to be understood that various forms, modifications and arrangements of the parts may be made without departing from the spirit and scope of the invention as claimed.

What I claim is:—

1. A gauge comprising a body of approximate J-shape, the longer arm or stem of the J being in the form of a tube closed at its top with the chamber of the tube terminating adjacent the lower end of the body, the shorter arm of the J having a recess at its upper extremity and the curve of the J being provided with a curved passage of a diameter considerably less than the diameter of the tube for connecting the recess with the tube, a packing gland in said recess, a graduated transparent gauge tube having its lower end open and extending through said gland into said recess communicating with said passage, the upper end of the gauge tube having a contracted opening, the bore of the gauge tube being of slightly greater diameter than that of the passage, a pressure pipe extending into the closed tube and opening into the upper part thereof, and a liquid filling for the J-shaped body.

2. A gauge comprising a body of elbow formation, a stand pipe carried by one end of the elbow and closed at its upper end with the chamber of the stand pipe terminating adjacent the lower end of the elbow, a gauge tube carried by the other end of the elbow, said elbow having an arcuate passage therein forming communication between the chamber of the stand pipe and gauge tube, said passage being of relatively small diameter and considerably less than the diameters of the stand pipe and gauge tube, the upper end of the gauge tube having a contracted opening, a pressure pipe extending into the stand pipe and opening adjacent the upper end thereof and a liquid filling for the elbow.

In testimony whereof I affix my signature

PETER J. SEFERLIS.